Figure 1:
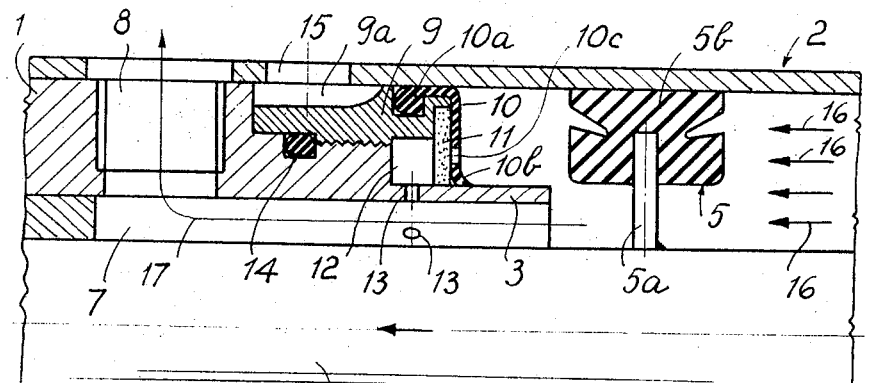

United States Patent Office 3,367,455
Patented Feb. 6, 1968

3,367,455
ADJUSTABLE SHOCK ABSORBER DEVICE FOR FLUID PRESSURE OPERATED CYLINDERS
Pier Luigi Panigati, Via Friuli 64, Milan, Italy
Filed Oct. 28, 1966, Ser. No. 590,378
Claims priority, application Italy, Nov. 2, 1965, 24,355/65, Patent 734,687
5 Claims. (Cl. 188—100)

The present invention relates to a shock absorber device for fluid pressure operated cylinders and more particularly for compressed air or pneumatic cylinders.

At present, the fluid pressure actuated cylinders are provided with a shock absorber device (also called anti-shock device) usually consisting of a stem enlargement adjacent the piston which cooperates at stroke end with an internal length of the cylindrical surface provided with gaskets and exhaust valves, so as to determine the formation of a fluid cushion for damping the stroke of said piston.

An adjustable needle valve is normally necessary to adjust the fluid flow through a conduit communicating with the space of said fluid cushion with the exhaust. For the piston return stroke there is also provided a single-direction valve which in the starting position allows a fluid passage from the intake to the space of said cushion in a sufficient amount to cause a rapid displacement of the piston from the end stroke position.

Such a known shock absorber device has however a number of drawbacks, among which the difficulty in adjusting said needle valve and an unsatisfactory operation at the beginning of piston return stroke.

In fact, when the piston reaches its end stroke position, after the damping due to the formation of the fluid cushion, there often occurs a so-called "sticking" effect between the piston itself and the head, whereby the return step cannot always regularly start (particularly when the cylinder has been idle for a long period in the end stroke position). In addition, the ratio of the initial thrust and the maximum thrust being transmitted to the piston is generally rather low.

Another disadvantage of the known shock absorber devices is that in order to obtain the damping cushions, relatively large spaces are often required (it is also known that for increasing the damping effect it is necessary to increase the volume of said cushions), which leads to the construction of cylinders of large overall dimensions and of high cost.

It is an object of the present invention to overcome the above-mentioned drawbacks of the known shock absorber devices, by devising a shock absorber device which is very easily adjustable, and of safe and reliable operation and such that under the same damping effect a substantial reduction of the anti-shock length is allowed in comparison to the known types.

It is another object of the invention to allow the omission of the conventional single-direction valve, which always had a too small section for the fluid passage at the piston return step, thus reducing the initial speed.

It is a further object of the invention to avoid the "sticking" effect at the end of the stroke of the piston and to allow a very high ratio of the initial thrust to the maximum thrust on said piston.

Another object of the invention is to provide a shock absorber device of a simple construction and rapid assembling.

These and still other objects are attained by a shock absorber device for fluid pressure actuated cylinders according to the invention, with a piston, a piston head at least at one end of the cylinder and means defining a damping fluid cushion at least at one end of the cylinder, characterized in that the cylinder head and the piston have at least partially complementary cooperating parts adapted to define together a space forming a shock-absorbing fluid cushion therein, when the relative position between said cylinder head and said piston is within a predetermined interval, a diaphragm member secured on said cylinder head and defining a wall of said space, at least one through-hole in said diaphragm, a porous cover member extending at least over the area of said through-hole and passage means providing communication between the outside and said porous cover member to allow limited fluid flow from said space through said porous cover member towards the outside and vice versa, and adjusting means adapted to adjust the position of at least one wall of said space.

Figure 2:
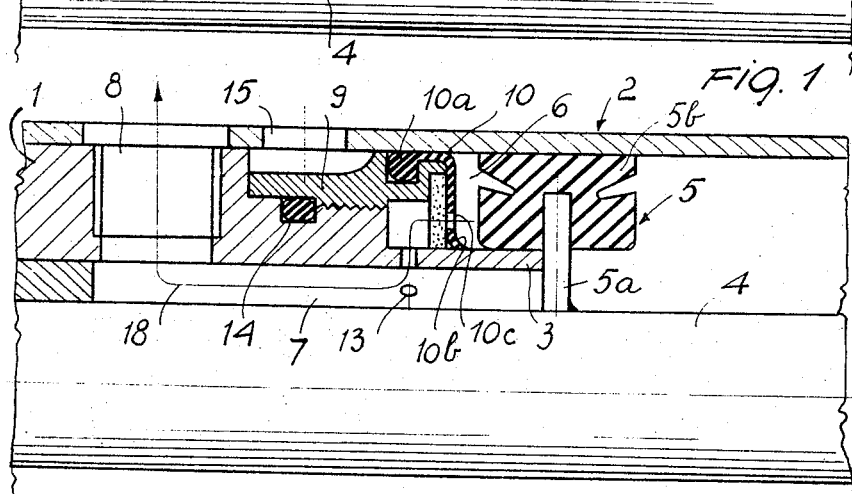
Figure 3:
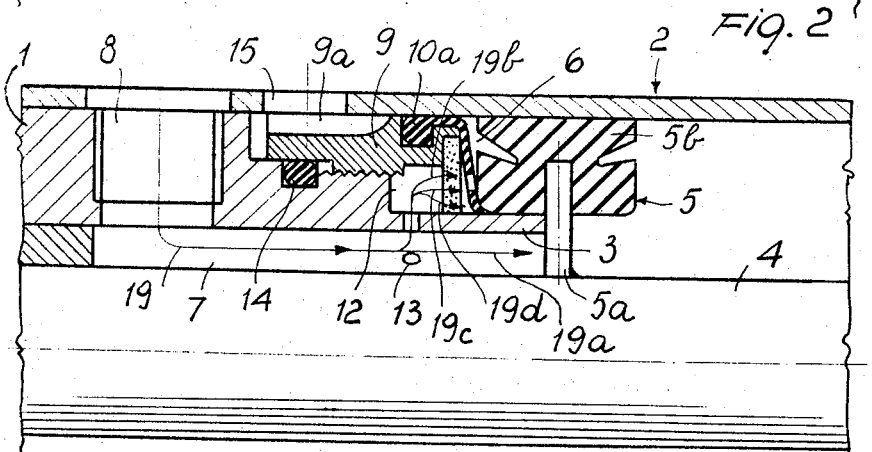

Further features and advantages of the invention will be more apparent from the detailed description of a preferred but not exclusive embodiment of a shock absorber device for fluid pressure actuated cylinders according to the invention, shown by way of indication and not of restriction in the accompanying drawing in which:

FIGS. 1 and 2 show axial sectional views of a significant portion of the fluid pressure actuated cylinder provided with the shock absorber device according to the invention, showing the piston before and in the stroke end position, respectively; and FIG. 3 is an axial sectional view of a portion of said fluid-pressure cylinder with the piston near the stroke end position just leaving the cylinder head for the return movement.

Referring to the drawing, the shock absorber device according to the invention is applied at a head 1 of a fluid pressure actuated cylinder 2 (in the case of a double-acting cylinder, two shock absorber devices will be provided, one for each head).

More particularly, a portion 3 projecting from the hollow head 1 is provided, which extends into the interior of the cylinder near the stem 4 carrying the piston 5. The end portion 3 of the head 1 has an outer diameter less than the inner diameter of cylinder 2.

The piston 5 consists of an annular element 5a secured to stem 4, which is associated to a peripheral annular element 5b of a substantially quadrangular cross-section, defining a peripheral rim projecting from piston 5, as shown in the figures.

Such an element 5b which, not necessarily may be of synthetic or natural polymeric material, is dimensioned so as to adherently penetrate at the end of the stroke between the portion 3 and the inner surface of cylinder 2. Thus, during the end displacement of piston 5 a compression space 6 (FIG. 2) is formed, within which a damping effect occurs by virtue of a compressed fluid cushion action.

The head 1 is so designed that between the same and the stem 4 a gap or passage 7 is provided, thus allowing the fluid to flow to exhaust 8 and vice versa, as hereinafter described.

On the inner side of head 1, and between the same and the inner surface of cylinder 2 a threaded sleeve 9 is provided which at the side opposite to the piston supports a diaphragm 10 (FIG. 1) of resilient or elastic material such as synthetic or natural rubber and an annular member 11 of porous material (such as syntherized bronze) behind said diaphragm.

The resilient annular diaphragm 10 has an enlarged portion 10a inserted within a peripheral groove in the threaded sleeve 9, whereas the portion 10b freely rests on the end portion 3 of head 1. On said portion 10b, diaphragm 10 is provided with a number of holes or orifices 10c (i.e., three holes circumferentially distributed), thus allowing the compression space 6 to communicate with an annular cavity 12 through the porous element 11, said annular cavity being defined by the sleeve 9, section 3 and element 11. In turn, annular cavity 12 communicates with gap or passage 7 through holes 13 formed in section 3. The passage 7 is preferably annular.

Between threadable body 9 and head 1 a seal gasket 14 of resilient material is arranged, whilst said sleeve 9 has externally throughout its periphery a plurality of recesses 9a enabling said body to be rotated about its axis by means of a tip, a screwdriver or the like, being inserted from the outside through at least a slit 15 provided in the wall of the cylinder 2.

As shown in FIG. 1, when piston 5 is urged in the direction shown by arrows 16 towards the stroke end position, the fluid between said piston and head 1 flows to exhaust 8 through gap or passage 7, according to a path indicated by line 17.

When piston 5 meets the portion 3, an annular compression space 6 is formed and operation of the device is as follows.

The fluid being confined within space 6 cannot reach the exhaust 8 by following path 17 (FIG. 1), but has to pass through orifices 10c of the diaphragm 10, porous member 11, annular cavity 12 and holes 13, following a path as substantially shown by line 18 of FIG. 2. Since orifices 10c are of a very small size, the passage of fluid to gap or passage 7 and exhaust 8 is very slow, thus obtaining a good damping effect.

If it is desired to increase such damping effect, it will suffice to axially displace the sleeve 9, by rotating it with respect to head 1 by means of a screwdriver or the like inserted through aperture 15 into notches 9a. For example, sleeve 9 may be moved toward the piston (FIG. 3), whereby the compression space 6 will be substantially made smaller, thus increasing the pressure of the fluid confined therein. The volume of space 6 at the stroke end position may be reduced to a value which approximates zero, with the achievement of very high pressure values. In fact, the flow to exhaust 8 through orifices 10c is always very low, while the compression space 6 decreases from a maximum initial value (upon contact between piston 5 and projecting portion 3) to a minimum final value varying from a predetermined value (such as that deducible from FIG. 2) to a smaller value depending upon adjustment and reducible to a value which approximates zero.

It is therefore apparent that, when the volume of chamber 6 is reduced to a value which approximates zero by suitably screwing the sleeve 9, the maximum damping effect will be obtained.

When fluid reversely enters cylinder 2, that is when exhaust 8 operates as fluid intake, the piston 5, being urged by said fluid in a direction opposite to that previously followed, is caused to displace backwards.

The supplied fluid will flow then along a path indicated by line 19 (FIG. 3) involving gap 7 and annular bore 12. Said path includes branches 19a, 19b, 19c, 19d, of which the first (19a) terminates at portion 5a of piston 5, whereas the remaining branches (19b, 19c, 19d) pass through holes 13, annular cavity 12, and porous member 11.

The porous element 11 does not oppose the passage of fluid in the direction shown by branches or lines 19b 19c, 19d, so that a substantial flow of fluid will take place to the resilient diaphragm. Such flow is generally greater than that obtainable by conventional systems.

Moreover, at this step, diaphragm 10 may move, under the fluid pressure from cavity 12, away from porous element 11 so as to facilitate piston displacement. Owing to the displacement of diaphragm 10, the fluid passage section is therefore increased, whilst according to branch 19d, a portion of said fluid may pass according to lines 19b and 19d.

Accordingly the fluid urges on piston 5, being distributed on a large surface thereof, so as to produce an initial pressure near the maximum pressure. In other words, a very high ratio approximately 1 of initial and maximum pressures is achieved.

It is also apparent that, due to diaphragm 10 and member 11, the "sticking" effect is avoided by the device according to the invention.

As it will be appreciated, the device provides a very sharp and sensitive adjustment since at each revolution of the sleeve 9 with respect to the head 1, there will correspond a very short axial displacement. Reference numbers according to a suitable scale may also be marked within grooves 9a of said annular body 9, so that adjustment may be read through aperture 15.

The so conceived invention is susceptible of many changes and modifications, all of which are within the scope of the inventive concept.

I claim:

1. A shock absorber device for fluid pressure operated cylinders with a piston, a cylinder head at least at one end of the cylinder and means defining a damping fluid cushion at least at one end of the cylinder, characterized in that the cylinder head and the piston have at least partially complementary cooperating parts adapted to define together a space forming a shock-absorbing fluid cushion therein, when the relative position between said cylinder head and said piston is within a predetermined interval, a diaphragm member secured on said cylinder head and defining a wall of said space, at least one through-hole in said diaphragm, a porous cover member extending at least over the area of said through-hole and passage means providing communication between the outside of said cylinder and said porous cover member to allow limited fluid flow from said space through said porous cover member towards the outside and vice versa, and adjusting means adapted to adjust the position of at least one wall of said space.

2. A shock absorber device comprising a cylinder, a hollow cylinder head with a section thereof extending into said cylinder, at least an end portion of said hollow head in said cylinder having an outer diameter less than the inner diameter of said cylinder, a piston in said cylinder provided with a peripheral rim projecting therefrom towards said cylinder head, the inner diameter of said rim being substantially equal to the outer diameter of said end portion of said hollow head, a fluid between said piston and said cylinder head, a transverse fluid passage at said end portion of said head, said passage being opposite to said piston rim, a resilient diaphragm element in said fluid passage, a rigid porous material member side by side with said diaphragm element, at least a through-hole in said diaphragm, and adjustment means at said cylinder head.

3. A shock absorber according to claim 2, wherein said transverse fluid passage opens into the inner hollow portion of said cylinder head.

4. A shock absorber device according to claim 1, wherein said adjustment means comprise a substantially axially threadable annular sleeve, arranged inside the cylinder on the cylinder head and controlling said diaphragm member and said porous cover member.

5. A shock absorber device according to claim 2, wherein said diaphragm is elastic and is peripherally retained by a threadable annular sleeve at an edge thereof and has its other edge freely resting around said end portion of said cylinder head.

References Cited

UNITED STATES PATENTS 3,175,645   3/1965   Schafer et al. _____ 188—97 X
3,302,756   2/1967   McIntyre _____ 188—88

MILTON BUCHLER, *Primary Examiner.*

G. E. A. HALVOSA, *Assistant Examiner.*